United States Patent Office 3,483,248
Patented Dec. 9, 1969

3,483,248
PREPARATION OF 2-(4-BIPHENYLYL) BUTYRIC ACID
Ian C. Pattison, Lawn, N.J., assignor to Warner-Lambert Pharmaceutical Company, Morris Plains, N.J., a corporation of Delaware
No Drawing. Filed Dec. 8, 1964, Ser. No. 416,888
Int. Cl. C07c 63/04, 103/22; A61k 27/00
U.S. Cl. 260—515                              3 Claims

ABSTRACT OF THE DISCLOSURE

A process for the preparation of 2-(4-biphenylyl)butyric acid by reacting 1-(4-biphenylyl)-n-propyl halide with magnesium and an isocyanate, followed by hydrolysis of the resulting product so formed.

---

This invention relates to an improved method for the preparation of biphenylylbutyric acid. More particularly, the present invention relates to an improved method for preparing 2-(4-biphenylyl)butyric acid from 1-(4-biphenylyl)n-propyl halide by reaction in particular solvents with magnesium and reactant isocyanates.

Biphenylylbutyric acid having the following formula:

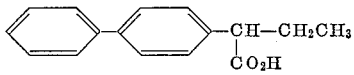

is a known compound possessing useful therapeutic properties. Recent studies made on biphenylylbutyric acid report that this compound is effective in the treatment of degenerative conditions which generally are bound up with old age such as arteriosclerosis and hypertension; impaired liver function such as cirrhosis of the liver, and the like conditions. Biphenylylbutric acids have also been reported, for example, by G. Annoni et al. in Farmaco sci. e. tec. (Pavig) 11, 244 (1956); Experientia, 12, 347 (1956); J. Am. Chem. Soc., 79, 758 (1957), to be effective in lowering cholesterol blood levels.

The 2-dimethylaminoethanol salt of 2-(4-biphenylyl)-butyric acid of the following structure:

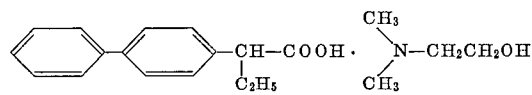

is disclosed by Dubnick in U.S. Patent No. 3,181,994, issued May 4, 1965, as possessing significant pharmacological activity as an analgesic agent in dosage units of from about 25 to about 150 milligrams of active ingredient without exhibiting the disadvantages of the known narcotic or salicylate analgesics. The narcotic analgesics, for example, while possessing an excellent measure of analgesic efficiency, are attended with habituation and addiction liabilities, nausea and vomiting, constipation or other effects due to the action of these compounds in the human body. The salicylate analgesics on the other hand possess a decrease level of analgesic efficiency compared to narcotic analgesics, and are more specific in the types of pain to which they are appropriate. In contrast, the 2-dimethylaminoethanol salt of 2-(4-biphenylyl)butyric acid has been observed to act completely unlike the salicylates or narcotic analgesics in that this compound appears to function as an analgesic with no significant prothrombin suppression or gastric upset.

One method for preparing biphenylylbutyric acid is that described in J.A.C.S. 65, pp. 1725–1727. However, since biphenylylbutyric acid possesses great potential as a therapeutic compound and as a derivative for the preparation of other therapeutic compounds, new improved methods for preparing this important compound more efficiently and ecconomically are deemed highly desirable.

It is an object of this invention, therefore, to provide a new improved method for the preparation of 2-(4-biphenylyl)butyric acid.

It is also an object of this invention to provide a method for the preparation of 2-(4-biphenylyl)butyric acid by a process wherein an unstable Grignard reagent is prepared in the presence of a co-reactant isocyanate whereby undesirable secondary reactions are minimized.

It is a specific object of this invention to provide a new method for preparing 2-(4-biphenylyl)butyric acid by hydrolyzing the reaction product formed in a Grignard reaction between certain halide substituted 1-(4-biphenylyl)-n-propyl compounds with magnesium and reactant isocyanates.

Other objects and advantages will become apparent from the following detailed description.

Generally, compounds of the present invention may be prepared by reacting a compound of the formula:

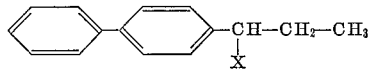

wherein X is halogen with magnesium and a reactant isocyanate in particular reaction solvents hereinafter described.

Initially, a first reaction is effected between magnesium and a lower alkyl halide such as methyl iodide, ethyl bromide or the like, in a reaction solvent such as ether or tetrahydrofuran. To this reaction mixture is then gradually added a solution of 1-(4-biphenylyl)-n-propyl halide and co-reactant isocyanate. A suitable solvent such as ether or tetrahydrofuran is also included along with the co-reactant isocyanate. Lower alkyl halide may also be included with the co-reactant isocyanate for promoting or entraining the reaction which follows.

After addition is made to the magnesium-lower alkyl halide mixture, the resulting reaction proceeds substantially to completion whereupon the Grignard complex so formed is hydrolyzed by any convenient method such as by addition of 5% hydrochloric acid. The resulting crude ester so formed may then be recovered and further hydrolyzed such as by refluxing in the presence of hydrobromic and acetic acids. Acetic acid in combination with dilute sulfuric acid may also be employed as may a system containing alkali hydroxide such as sodium hydroxide, potassium hydroxide or the like in combination with water and alcohol for reflux control. The system is generally refluxed at a temperature greater than about 120° C. The upper temperature limit of reflux will depend on the alcohol used in the system and is generally to about 200° C. Alcohols which are found useful in the system include ethylene glycol, propylene glycol, diethylene glycol, glycerol, and the like as well as mixtures thereof whereupon 2-(4-biphenylyl)butyric acid may be isolated from the refluxed mass.

The reactions involved in the present method generally take place according to the following reaction scheme:

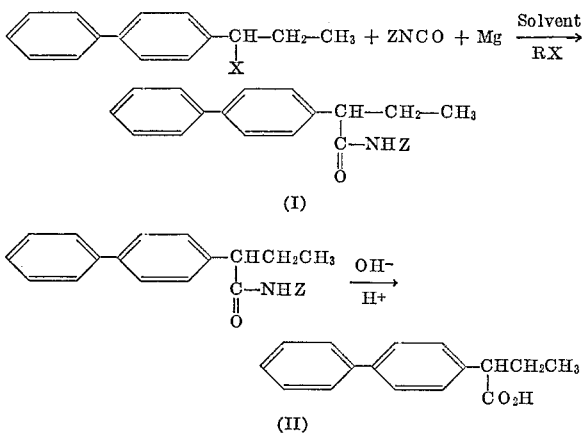

wherein X is halogen such as chlorine or bromine, R is lower alkyl having 1 to 3 carbon atoms and aryl such as phenyl, benzyl, naphthylene or lower alkyl having 1 to 3 carbon atoms Z. Z is an alkyl or an aryl radical.

Although an excess amount of magnesium may be present in reaction sequence I above, it is generally convenient to employ only an amount of magnesium slightly greater than an equal molar quantity or that amount sufficient to react with both the total amount of lower alkyl halide and 1-(4-biphenylyl)-n-propyl halide employed in the system.

The amount of lower alkyl halide used for the primary reaction is preferably that amount sufficient to initiate the reaction with a small portion of the magnesium.

The lower alkyl halide which may be present, if desired, in the added solution is preferably the minimum amount necessary to adequately entrain the reaction and will depend upon the solvent of the reaction system, the temperature of reaction, and the particular components reacted.

The amount of reaction solvent employed in the reaction between magnesium and lower alkyl halide is that amount up to about 50 times the weight of lower alkyl halide.

Equimolar amounts of 1-(4-biphenylyl)-n-propyl halide and reactant isocyanate are usually present in the reaction system. Any convenient amount of ether or tetrahydrofuran may be employed as the solvent for the solution being added although about 3 ml. to about 10 ml. per gram of 1-(4-biphenylyl)-n-propyl halide is preferred. The product of hydrolysis is found to be 2-(4-biphenylyl) butyric acid. For therapeutic use, the acid may be formed into the pharmaceutically useful nontoxic salts and combined with conventional inert pharmaceutical carriers to form dosage units such as tablets, capsules, solutions, suspensions, elixirs suppositories and the like.

The following examples are included in order further to illustrate the present invention:

EXAMPLE 1

To a flask containing 4.62 gms. of magnesium in 5 ml. of tetrahydrofuran is added 0.5 gm. of ethyl bromide. When a vigorous reaction has begun, a solution of 41.25 gms. of 1-(4-biphenylyl)-n-propylbromide, 21.45 gms. of phenylisocyanate and 2.77 gms. of ethyl bromide in 150 ml. of tetrahydrofuran is added over a 35 minute period. The reaction is warmed to maintain reflux during the addition and for one hour thereafter. The solvent is then evaporated, benzene is added, and the reaction is hydrolyzed with 5% hydrochloric acid. The solids are collected by filtration. The organic phase of the filtrate is washed with water, dried and evaporated and the residue is triturated with ether and filtered. The combined solids are recrystallized from acetic acid to give substantially pure 2-(4-biphenylyl)butyranilide.

A 3.15 gm. portion of the pure 2-(4-biphenylyl)butyranilide is combined with 5 gms. of potassium hydroxide and 25 ml. of ethylene glycol and refluxed for 2½ hours. The system is then diluted to 100 ml. with water, washed with ether, acidified with hydrobromic acid and extracted with ether. The ether is dried and evaporated to give substantially pure 2-(4-biphenylyl)butyric acid.

Another 3.15 gms. portion of the 2-(4-biphenylyl)butyranilide is refluxed for three hours in 15 ml. of 48% hydrobromic acid and 25 ml. of acetic acid. The product is diluted is 100 ml. with water and substantially pure 2-(4-biphenylyl)-butyric acid is collected by filtration.

EXAMPLE 2

The method of Example 1 is repeated using ethylisocyanate in place of phenylisocyanate with appropriate adjustments being made in the amount added. Comparable results are realized.

EXAMPLE 3

To a flask containing 5.10 gms. of magnesium in 5 ml. of tetrahydrofuran is added 0.3 ml. of ethyl bromide. When a vigorous reaction has begun, a solution of 23.07 gms. of 1-(4-biphenylyl)-n-propyl chloride, 10.9 gms. of ethyl bromide and 23.82 gms. of phenylisocyanate in 145 ml. of tetrahydrofuran is added over a 75 minute period, maintaining a gentle reflux. Refluxing is continued by warming for another 40 minutes. The reaction is cooled and hydrolyzed with 5% hydrochloric acid. 150 ml. of ether is added and the organic phase is washed with water, dried, and evaporated to give crude 2-(4-biphenylyl)butyranilide. This product is then refluxed for 2¼ hours in 120 ml. of acetic acid and 75 ml. of 48% hydrobromic acid, diluted with water and extracted with ether. The ether is shaken with 4 N sodium hydroxide and filtered. Both the collected solids and the aqueous filtrate are washed with ether, recombined and acidified with hydrochloric acid. Upon extraction with ether, substantially pure 2-(4-biphenylyl)butyric acid is recovered.

EXAMPLE 4

To a flask containing 0.73 gm. of magnesium in 2 ml. of tetrahydrofuran is added 0.1 ml. of ethylbromide. When a vigorous reaction has started, a solution of 4.62 gms. of 1-(4-biphenylyl)-n-propyl chloride, 2.74 gms. of phenylisocyanate and 0.25 ml. of ethyl bromide in 48 ml. of tetrahydrofuran is added over a 15 minute period, warming to maintain reflux during the addition and for two hours afterward. The product is cooled and hydrolyzed with 5% hydrochloric acid, the aqueous phase washed with ether and the combined organic phases evaporated to give crude 2-(4-biphenylyl)butyranilide. This product is refluxed for 2½ hours in 25 ml. of acetic acid and 15 ml. of 48% hydrobromic acid, diluted to 100 ml. with water and extracted into ether. The ether is extracted with 10% ammonia solution to dissolve the solids. The system is then acidified with hydrobromic acid and extracted with ether. After the ether is dried and evaporated substantially pure 2-(4-biphenylyl)butyric acid is recovered.

EXAMPLE 5

The method of Example 4 is repeated using benzyl isocyanate in place of phenylisocyanate with appropriate adjustments being made in the amount added. Comparable results are realized.

EXAMPLE 6

To a flask containing 1.95 gms. of magnesium in 2 ml. of tetrahydrofuran is added 0.37 gm. of ethyl bromide. When a vigorous reaction has started, a solution of 20.63 gms. of 1-(4-biphenylyl)-n-propylbromide and 17.9 gms. of phenylisocyanate in 61 ml. of tetrahydrofuran is added over a 15 minute period, maintaining a gentle reflux. The reaction is then warmed to continue the refluxing for 45 minutes after which it is cooled and hydrolyzed with 5% hydrobromic acid. 100 ml. of benzene is next added and the organic phase, containing solids, is washed with water and evaporatetd to give crude 2-(4-biphenylyl)butyranilide. This product is next combined with 16.4 gms. of potassium hydroxide and 100 ml. of ethylene glycol and refluxed for 30 minutes. After cooling, the system is diluted to 250 ml. with water and washed with benzene, whereupon hydrobromic acid is added and the system extracted with ether. The ether is dried, charcoaled and evaporated to give substantially pure 2-(4-biphenylyl)-butyric acid.

It is to be understood that the foregoing detailed description is given merely by way of illustration and that many variations may be made therein without departing from the spirit and scope of this invention.

What is claimed is:

1. A method for preparing 2-(4-biphenylyl)butyric acid which comprises, initiating a reaction between magnesium and lower alkyl halide selected from the group consisting of methyl iodide and ethyl bromide, adding to the initiated reaction 1-(4-biphenylyl)-n-propyl halide and a member selected from the group consisting of aryl isocyanate and lower alkyl isocyanate, hydrolyzing first in an acetic medium and then in a basic medium the resulting product so formed, and recovering 2-(4-biphenylyl)butyric acid.

2. The method of claim 1 wherein 1-(4-biphenylyl)-n-propyl halide is 1-(4-biphenylyl)-n-propyl chloride.

3. The method of claim 1 wherein 1-(4-biphenylyl)-n-propyl halide is 1-(4-biphenylyl)-n-propyl bromide.

References Cited

Schwartz, A. M., et al.: J.A.C.S. 53 1063, 1931.

Degering, E. F.: "An Outline of Organic Nitrogen Compounds," Univ. Lithoprinters, Ypsilanti, Mich., 1950, p. 508.

LORRAINE A. WEINBERGER, Primary Examiner

P. J. KILLOS, Assistant Examiner

U.S. Cl. X.R.

260—558, 999